UNITED STATES PATENT OFFICE.

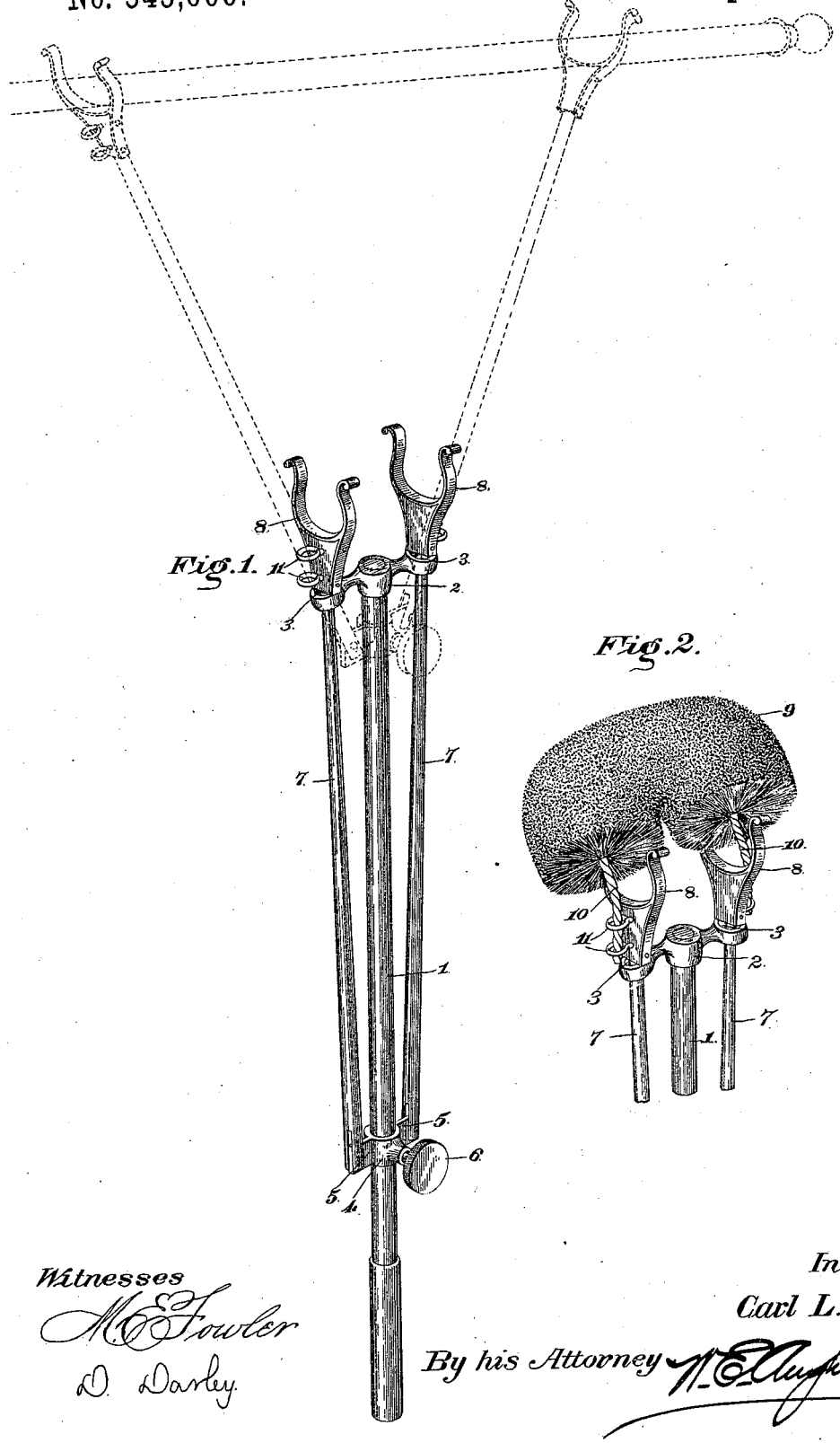

CARL L. NELSON, OF SEATTLE, ASSIGNOR TO ANDREW NELSON, OF KIRKLAND, WASHINGTON.

DUSTER AND CURTAIN-POLE LIFTER.

SPECIFICATION forming part of Letters Patent No. 545,606, dated September 3, 1895.

Application filed January 26, 1893. Renewed March 6, 1895. Serial No. 540,779. (No model.)

*To all whom it may concern:*

Be it known that I, CARL L. NELSON, a citizen of the United States, and a resident of Seattle, in the county of King and State of Washington, have invented a certain new and useful Improvement in Dusters and Curtain-Pole Lifters, of which the following is a specification.

My invention has relation to curtain-dusters and curtain-pole lifters; and my object is to provide a device of this character which will be compact, cheap to manufacture, durable in use, and ornamental in appearance.

In the drawings, Figure 1 is a perspective view of my invention, the dotted lines showing the device in its opened position. Fig. 2 shows a portion of the device provided with a dust-brush.

1 indicates the handle of the duster or curtain-pole raiser, provided at its extremity with a metallic cross-head 2, having openings or guides 3 3 in its ends. A collar 4, having flanged arms 5 5, is adjustably secured to said handle 1, and may be retained in any desired position on said handle by means of the set-screw 6. The lower ends of the rigid divergent rods 7 7 are pivotally connected to the flanged arms 5 5 of the collar 4, while the other ends pass through the openings or guides 3 3 in the cross-head 2 and are provided at their extremities with yokes 8 8, made of some malleable metal in order to reduce their liability to break. The outer sides of the divergent rods 7 7 are also provided with eyes 11 11 for a purpose to be hereinafter described.

In Fig. 2 of the drawings my device is shown used as a duster, a suitably-constructed brush 9, having depending arms 10 10, being secured in the eyes 11 11.

When it is desired to use the device as a curtain-pole raiser, the collar 4 is slid up on the handle 1, as indicated in dotted lines in Fig. 1, and by means of the set-screw 6 is retained in the desired position. The curtain-pole is then placed in the yokes 8 8 and may readily be placed where desired by the operator. The device may also be used for hanging or taking down pictures, clothing, or other articles, and when not in use may be closed, as illustrated in full lines in Fig. 1. With the dust-brush 9 attached to the device high objects may be readily reached and cleaned.

Having thus fully described my invention, what I claim, and desire to secure by Letters Patent of the United States, is—

1. An implement comprising a handle having a smooth upper end, a cross-head having guides, an adjustable collar adapted to freely slide on said handle, rods connected with said collar and adapted to be diverged by the guides on the cross piece.

2. An implement comprising a handle having a smooth upper end, a cross-head having guides, an adjustable slidable collar, rods connected with said collar and adapted to be diverged by the guides on the cross piece, said diverging arms being provided with means near their upper ends for supporting thereon an article.

3. An implement comprising a handle, a cross-head having guides near its ends, an adjustable collar provided with means for securing it in any position on the handle, rigid diverging rods pivotally connected to the flanged arms of said adjustable collar, and passing through the guides in the cross-head, and means near their upper ends for supporting outside thereof an article.

4. An implement comprising a handle, a cross-head on said handle having guides near its ends, an adjustable collar having a set screw therein and provided with flanged sides, rigid divergent rods pivotally connected to said flanged sides and passing through the guides in the cross-head, said rods being each provided at their free end with a yoke and with eyes.

In testimony whereof I hereunto affix my signature, in the presence of two witnesses, this 31st day of October, 1892.

CARL L. NELSON.

Witnesses:
SAMUEL KEHOE,
EDWARD C. KRIETE.